July 4, 1967   R. H. THEDFORD   3,328,860
APPARATUS FOR TRIMMING CERAMICS
Filed May 5, 1965   2 Sheets-Sheet 1

INVENTOR
RUSSELL H. THEDFORD
BY *Milton L. Simmons*
ATTORNEY

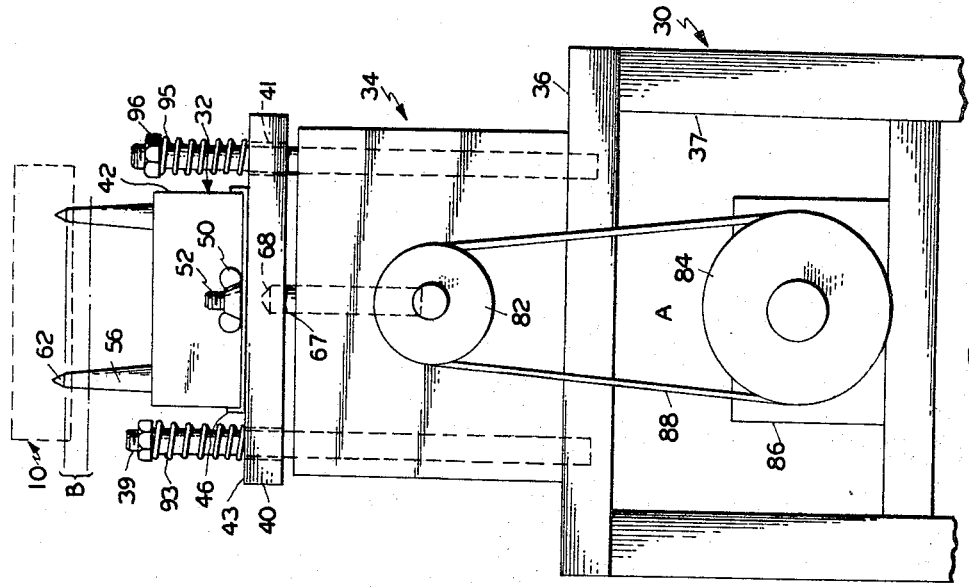
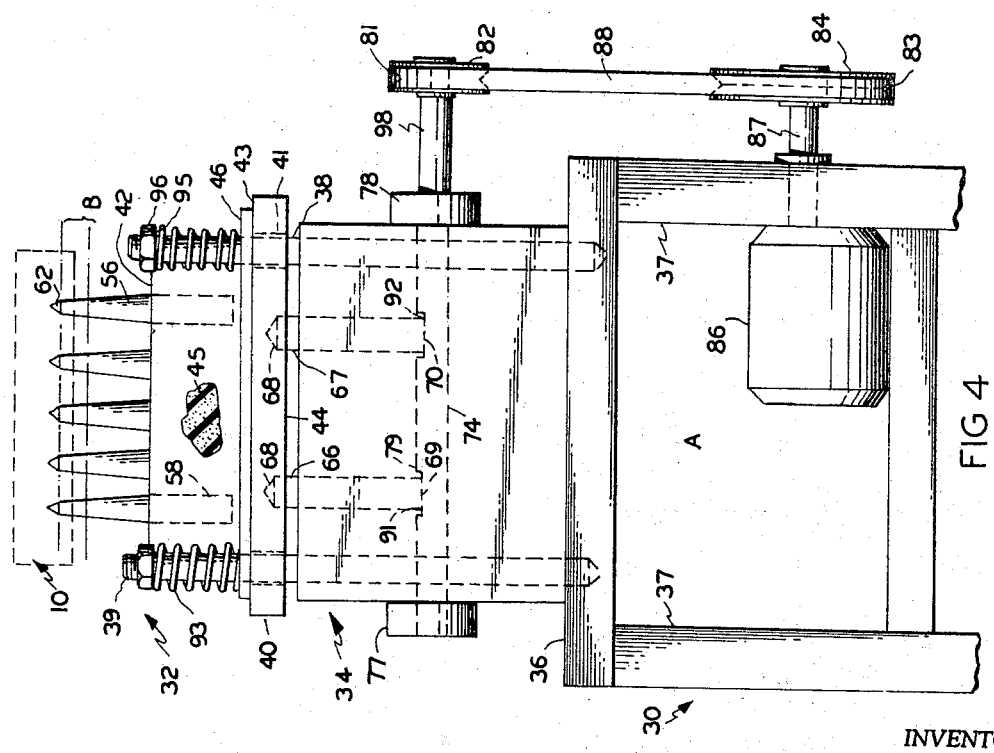
INVENTOR
RUSSELL H. THEDFORD
BY *Milton L. Simmons*
ATTORNEY

United States Patent Office 3,328,860
Patented July 4, 1967

3,328,860
APPARATUS FOR TRIMMING CERAMICS
Russell H. Thedford, Tyler Tex., assignor to Ferro Corporation, Cleveland, Ohio, a corporation of Ohio
Filed May 5, 1965, Ser. No. 453,425
3 Claims. (Cl. 25—1)

ABSTRACT OF THE DISCLOSURE

An apparatus for removing die webbing and flashing from the apertures of a green, fragile ceramic body comprising a series of tapered fingers designed to probe and enter said apertures in a reciprocal motion, the wider bases of said fingers firmly but flexibly embedded in a resilient elastomer to thereby permit slight, temporary lateral deflection of said fingers if one or more happens to be imperfectly aligned with its particular aperture, thus permitting the probing tip of such finger to drift slightly in response to somewhat off-center contact with a given aperture wall during reciprocal motion of said finger, thus "reach" and safely ream a slightly off-center aperture without fracturing and ruining said green fragile body.

---

This invention relates generally to the removal of die-flashing from openings or apertures in a lattice or other planar design forming a pattern in a green ceramic body. More particularly, the invention relates to an apparatus for carrying out the removal of die-flashing using a plurality of vibrating axially parallel elongated members or fingers configured to fit snugly into the openings outlined by the lattice.

Die-flashing is extraneous material extruded between the abutting faces of a die during the pressing of a body. Die-flashing usually takes the form of a thin film or web extending in a plane beyond the edge of a cast body or into a hole or void space in the wall of the body. This film or web must be removed by various methods depending on the type of constituent material used for making the body. Where metals are die-cast to form objects having various structures, the removal of die-flashing or burrs from the cast objects is relatively easy; grinding the burrs down usually is no problem because generally metals are tough and permit rough handling. Grinding wheels, drills and various other abrading devices can be used to remove the die-flashing or burrs with little danger of damaging the cast object itself.

This is not the case, however, where the constituent material is delicate, friable and relatively inflexible unfired ceramic. Where a ceramic body is designed with holes or voids in the body, any die-flashing extending into these holes fully or partially to span or obstruct the opening is difficult to remove completely without damaging the article itself. Because of the delicate nature of green ceramic bodies, the removal of die-flashing from many types of bodies has become in the nature of an art and is performed by persons of relatively high manual skill and dexterity. This removal of die-flashing has become known as fettling and those performing the fettling being known as fettlers.

An example of a pressed ceramic body wherein the removal of die-flashing has been a problem is a heater radiant used in gas space heaters and the like. Generally heater radiants are constructed with two parallel walls, one of which comprises an open lattice work, usually forming an ornamental design or pattern and the other wall acting primarily as the radiator, emanating heat rays through the openings in the lattice.

This type of heater radiant usually is made by pressing the component walls separately and cementing them together with slip after the parts have dried. The die-flashing formed during the pressing of this type of radiant usually spans each open area defined by the lattice wall, and must be removed while the pressed radiants are still green, that is before firing, otherwise the die-flashing becomes fired along with the body itself to form a hard abrasive material, which is difficult to remove.

Because the green radiants are fragile and friable and tend to shrink irregularly, heretofore only manual means could effectively be used for removal of the die-flashing. This manual removal of die-flashing was carried out by an operator using an awl or other ice-pick-like instrument. The awl was used to puncture the die-flashing remaining in each hole or aperture in the radiant and to rub against the sides of the interconnecting ribs or lattice members defining the array of apertures.

This method of removing die-flashing from the apertures in the lattice work of the heater radiants has always been considered a bottleneck in the mass production of these items. Moreover, the skill of the worker performing the fettling operation determines the degree of production attainable. The relative skill of the person, being in direct proportion to the efficiency of the fettling or removal of the die-flashing, was measured by the speed at which the pieces were finished and the percentage of pieces broken by the person.

In the training of persons to operate as fettlers in the production of radiants, only those persons having a certain innate ability can be chosen. Before a person is chosen to be trained as a fettler, he is usually required to take a test which will reveal his or her dexterity. After passing the test the person is trained for a period of about six weeks before he is put on a production line. Even after training the average fettler can only fettle six hundred to seven hundred radiants per day, while the exceptional ones may handle eight hundred to nine hundred radiants per day.

It is therefore a general object of the present invention to provide an apparatus which will remove die-flashing from a friable ceramic body.

It is another object of the present invention to provide an apparatus which will remove die-flashing from apertures in a friable ceramic body.

It is still another object of the present invention to provide an apparatus which will remove simultaneously die-flashing from every aperture in an array of apertures comprising a pattern in the face of a friable ceramic body.

It is still further another object of the present invention to provide an apparatus which will remove die-flashing from apertures in friable ceramic bodies which vary in structure due to irregular shrinkage.

Another important object of the present invention is to provide an apparatus which will remove die-flashing simultaneously from every aperture in an array of apertures in a face of a friable ceramic body in a very short time and which can be used in the mass production of the friable ceramic body.

Yet another important object of the present invention is to provide an apparatus which will remove die-flashing simultaneously from every aperture in an array of apertures in a friable ceramic body which apparatus can be operated with relatively little training.

In accordance with the present invention these and other objects are attained with an apparatus, comprising a plurality of tapered elongated bodies or fingers, the cross sections of which are shaped to conform to the configuration of the apertures or openings which are obstructed by die-flashing thus permitting the fingers to fit snugly into each aperture and substantially simultaneously against all of the walls defining the apertures. The elongated bodies are set in a resilient mass to permit lateral deflection of the fingers caused by slight deviations in the position of the apertures due to irregular shrinkage of the ceramic body during the drying. A suitable means is connected to the resilient mass to cause the elongated bodies to vibrate axially while they are being fitted snugly into the apertures whereby the die-flashing is contacted and removed.

The elongated bodies or members have coplanar tapered axial zones near their ends where the cross sections along these zones have the same shape as that of the corresponding apertures of the pattern and dimensionally range from being greater than the cross section of the aperture to being smaller than the cross section of the aperture. Axially at the point at which the cross sections are substantially the same size as the apertures, there is defined a plane which cuts the apertures at the die-flashing and coincides with the plane defined by the die-flashing. Preferably from the upper end of the axial zone to the end or terminus of the fingers the body sharply increases in taper to define a terminal indexing portion which acts initially to contact and break the die-flashing. The axial measurement of the indexing portion must be short enough so that the elongated member does not extend far enough through the aperture to puncture the rear wall of the radiant and also to allow easy withdrawal of the radiant without breaking any ribs comprising the lattice.

Advantageously the resilient body is positioned on a rigid plate mounted for vertical movement along vertical guides such as rods and the like. The rigid plate is cooperatively engaged by any vibrator which is capable of vibrating the rigid plate along a line which is parallel to the axes of the elongated bodies or members.

In a preferred form the rigid plate is provided with cam follower means extending below the rigid plate and adapted to move the plate upwardly when any force is applied to the cam follower. The rigid plate is biased downwardly to control the smoothness of the vibration and prevent erratic movement as the plate rides with the cam follower. The cam follower is positioned to be in contact with a rotating cam shaft having a flat portion or any other camming surface which meets the end of the cam follower each time the cam shaft makes a revolution. As the cam shaft rotates, it alternately lifts and drops the cam follower, counteracting the biasing force, to thereby vertically reciprocate the rigid plate.

The fettling operation is carried out advantageously by positioning a radiant, manually or otherwise, so that the elongated members or fingers extend snugly into the array of apertures while the base is vibrating or reciprocating. As the radiant is brought into position, the indexing portion of the fingers preceding the tapered portion breaks the web of die-flashing. The tapered portion then engages the side walls of the interconnecting ribs of the lattice or pattern and removes most of the remaining burrs.

The apparatus of the instant invention not only obviates the need for skilled persons to remove the die-flashing from green heater radiants but also provides a means by which the removal of the die-flashing can be performed very rapidly; the increase in production per fettler or operator is at least three times that of a skilled fettler using prior methods. Moreover, the percentage of radiants broken using the apparatus of the instant invention is nominal; much below that incurred when manual means are used.

That the die-flashing can be removed so effectively and efficiently according to the present invention is not obvious inasmuch as strictly manual methods have been used for many years, specifically the use of an awl or other ice-pick-like device to chip and rub away the die-flashing. Since the advent of heater radiants, which was at least 50 years ago, no successful improvements relating to the removal of die-flashing from apertures in the heater radiant or for that matter any other friable ceramic body have come to the forefront.

In order to better understand the present invention and illustrate how the foregoing objects may be attained, reference is made to the accompanying drawing wherein there is set forth a particular and preferred embodiment. In the drawings:

FIGURE 4 is a side view in elevation of a complete apparatus embodying the present invention.

FIGURE 5 is a side view in elevation of a complete apparatus embodying the present invention but rotated horizontally 90° from the view shown in FIGURE 4.

Figure 1:
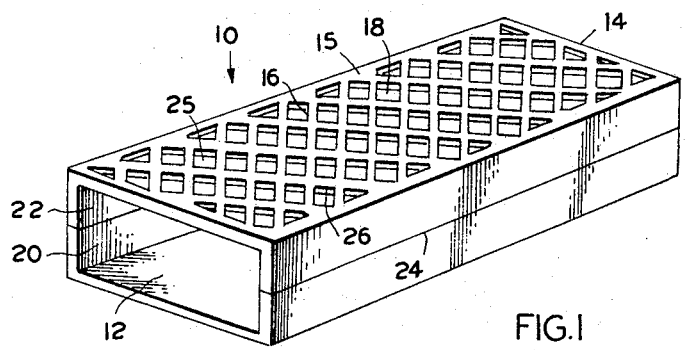
FIGURE 1 is a perspective view in elevation of a heater radiant.

Referring now to the drawing there is shown a heater radiant 10 representative of a typical ceramic body which must have die-flashing and other imperfections removed before the body is considered "finished" for commercial use. The heater radiant 10 includes a rear wall 12 primarily functioning as radiator and a decorative front wall 14. The front wall 14 primarily is composed of a face 15 defined by an integral geometric arrangement of interconnecting members or ribs 16 in the form of a pattern optionally defining diamond-shaped apertures 18, or other patterns or designs as desired. The sides 20 and 22 of the rear wall 12 and the front wall 14 respectively are joined together along a seam 24.

Die-flashing which is to be removed pursuant to the principles of the invention is shown as plate-like or web-like material 25 extending coincidentally with the back of the front wall 14 and substantially coplanar therewith. Depending on the die employed for making the front wall the die-flashing may extend from the side wall 26 at varying depths, in many instances from the middle of the wall. Generally this material 25 extends continuously and completely across the diamond-shaped apertures 18 as shown in FIG. 1.

As has been explained hereinbefore and will be explained more fully hereinafter, the die-flashing or web-like material is removed by directing an axially tapered surface against the side walls 26 of the interconnecting members or ribs 16 making up the face 15 of the front wall 14. The tapered surfaces, which preferably are coated with an abrasive, are axially reciprocated or vibrated snugly against the sides 26. Advantageously the degree of taper may range from 5° to 15° but this is a matter of choice and may be varied to suit the purpose.

A particular and preferred embodiment of an apparatus for carrying the present invention into effect is shown in FIGURES 4 and 5 where there is shown a support assembly 30, a die-flashing removal means 32 mounted for vertical movement thereon and a cam and follower assembly 34 engaging the die-flashing removal means 32 to cause the means 32 to reciprocate or vibrate vertically.

The support assembly 30 includes a flat horizontal base 36 supported by four legs 37, positioning the base 36 to provide a space A beneath the base, and four vertically mounted guide members or rods 38 extending upwardly from the base 36.

Providing the foundation for the die-flashing removal means is a rigid member or plate 40 having an upper surface 43. The plate 40 slidably embraces each of the rods 38, with the rods 38 passing through four holes 41 in the corner extremities of the plate 40 axially perpendicular to the plate and axially coincidental with the axes of the guide rods 38. Supported on the top surface 43 of the plate 40 is a box or container 42 made from metal or other rigid material. The container 42 is affixed firmly to the top surface 43 of the plate 40 by a bed 46 integral with the bottom of the container 42. The bed 46 is secured to the top surface 43 with wing nuts 50 threadedly engaging two studs 52 spaced at the ends of the plate 40.

Extending axially upwardly from the inside of the box or container 42 is an array of elongated members or fingers 56. Lower portions 58 of the fingers 56 are embedded in and flexibly held by a cast or otherwise formed resilient body 45 comprising an elastomeric material such as rubber or the like. Each of the fingers 56 is positioned so that its longitudinal axis would be coincidental with the axes perpendicular to the center of each aperture in an array of apertures such as the apertures in the face 15 of a heater radiant 10.

Figure 2:
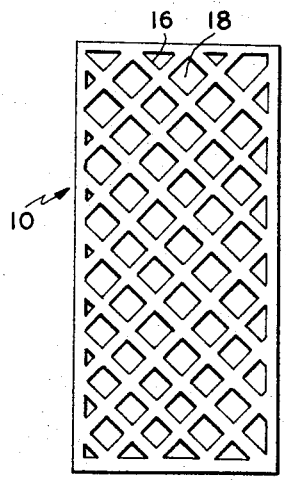
FIGURE 2 is a plan view of a heater radiant.
Figure 3:
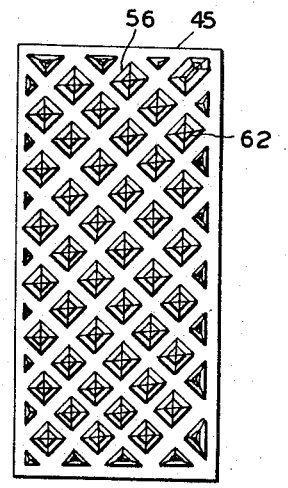
FIGURE 3 is a plan view of the uppermost part of an apparatus of the present invention.

The design or pattern provided by the array of fingers 56 then is determined by the pattern of apertures in the face 15 of the heater radiant 10 defined by the interconnecting members or ribs 16. The design and arrangement of the elongated members or fingers 56 in the container 42 may be understood more easily by referring to FIGURES 2 and 3 taken in conjunction with FIGURES 1, 4, and 5. Each of the diamond-shaped apertures 18 defined in the face of the radiant shown in FIG. 2 has a predesigned and dimensioned lateral cross section. The plan view of the array of elongated members or fingers 56 presented in FIGURE 3 shows the fingers 56 as defining a pattern substantially the same as the pattern in the face 15 of the radiant 10; representing a design however which is the reverse of the pattern in face 18 with the array of fingers representing a male component as opposed to the array of apertures being the female component.

Axially along each of the fingers 56 is a tapered zone B which has a cross section configured to conform to that of the corresponding aperture in the pattern. The inclination of the taper in relation to the longitudinal axis is not great. Dimensionally along the zones the fingers 56 diminish in cross section from cross sections greater than that of the corresponding aperture to cross sections smaller than the corresponding aperture. A terminal or indexing end portion 62 begins where the tapered zone B ceases. The inclination of the taper along the indexing end portions relative to the axis increases sharply and terminates at an edge or a point. The terminal or indexing portion 62 is provided as an optional feature and may be eliminated entirely, especially where the apertures in the pattern are large and permit positioning of the radiant on the fingers easily.

In its preferred form the exposed surfaces of the fingers 56 are coated with an abrasive material (not shown), such as sand, alumina grit and the like which is set in a binder such as, for example, a thermoset polyester resin and the like. The fingers 56 are made preferably from a substantially rigid material having a light density such as wood, various plastic materials and the like.

Two cam follower rods 66 and 67 are pendantly secured to the bottom 44 of the plate 40, engaging threaded holes 68 and extending downwardly so the axes of the cam follower rods substantially define a vertical plane. Immediately below the cam follower rods 66 and 67 is a cam shaft 74 journalled in bearings (not shown) and positioned to rotate about a horizontal axis which is cut by the said vertical plane. Sealing the cam shaft 74 and containing the bearings are caps 77 and 78 supported by member 36.

The cam shaft 74 is positioned vertically so the longitudinal or axial surface 79 of the cam shaft 74 abuts the cam follower rods 68 at working end surfaces 69 and 70 whereby the entire die-flashing removal means rests on the cam shaft 74. Axially spaced along the cam shaft 74 are two flat areas 91 and 92 located directly below, and intermittently engaging, the cam follower rods 66 and 67 respectively. The flat areas 91 and 92 are machined so that the surfaces of the flat areas are substantially coplanar and therefore come in contact with the working end surfaces 69 and 70 simultaneously upon rotation of the cam shaft 74, cooperating with the rounded part of the axial surface 79 which acts as a cam.

At the upper end portion 39 of each of the rods 38 is a coil spring 93 coaxially positioned thereon between the top surface 43 of the plate 40 and an annular face 95 of a nut 96 threadedly fixed to the upper end portion 39 of the rods 38. The spring 93 is slightly compressed to effect a biasing force downwardly against the plate 40 for reasons which will be explained more fully hereinafter.

The cam shaft 74 is provided with an axailly extending end portion 98 and mounted thereon in a V-grooved pulley 82. Mounted on a shaft 87 integral with an armature of a motor 86, fixedly mounted in the space below the base 36 of the support assembly 30 is another V-grooved pulley 84. A V-belt 88 is positioned on the pulleys 82 and 84 and snugly fitted into grooves 81 and 83 of the pulleys 82 and 84 respectively. Upon rotation of the pulley 84 the V-belt is caused to travel around both of the pulleys and in turn causes the pulley 82 to rotate as the V-belt frictionally transmits energy thereto from the motor 86.

In operation the motor 86 is turned on. As is evident from the drawing, energy is transmitted from the motor 86 to the cam shaft 74 by way of the V-grooved pulleys 82 and 84 and the V-belt 88. As the cam shaft 74 rotates the flat areas 91 and 92 cyclically meet the working end surfaces 69 and 70 of the cam follower rods 66 and 67. At each meeting the entire die-flashing removal means is allowed to descend slightly as the cam follower rods move from the rounded surface onto the surface provided by the flat areas 91 and 92. As the flat areas move out of position and the rounded surface returns to contact the cam follower rods 66 and 67, the cam follower rods and the entire die-flashing removal means is cammed upwardly. This raising and lowering cycle of the die-flashing removal means being dependent on the rate of rotation of the cam shaft 74 is thereby controlled by the rotational speed of the motor 86. As the rotation of the cam shaft 74 is increased, the camming action becomes less efficient because the cam follower rods 66 and 67 are "bounced" off the cam shaft 74 as the flat areas 91 and 92 are moved out of contact with the working surfaces 69 and 70 and the rods 66 and 67 do not descend in time to meet the flat areas 91 and 92 as they return to contact the working surfaces. As a consequence the resultant vibration becomes erratic.

The vibration is brought to a smooth continuous movement by screwing the nuts 96 downwardly on the rods 38 to increase the biasing force of the coil springs 93 against the top surface of the plate 40. After the vibration of the die-flashing removal means has been brought to the desired frequency and amplitude, a heater radiant such as that shown in FIGURE 1 is fitted onto the array of elongated members or fingers 56 which have previously positioned geometrically to mesh with the array of apertures 18.

In actual use an operator or fettler takes a heater radiant with one hand so that the array of apertures is facing outwardly. Then with a downward movement the fettler fits the heater radiant onto a corresponding array of vibrating fingers so that the die-flashing is impaled thereby and moves the radiant over the fingers until there is manifest resistance to the downward movement. At this point substantially all of the die-flashing is removed. The heater radiant then is withdrawn from the fingers and passed on for any further operations.

Figure 6:
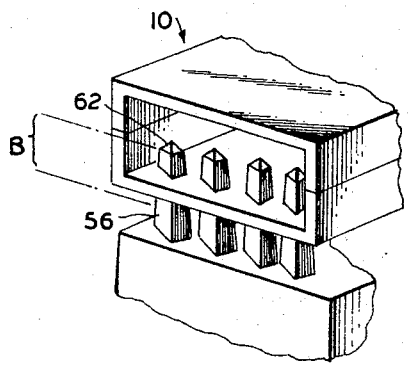
FIGURE 6 is a fragmentary enlarged perspective view in elevation of the uppermost portion of an apparatus embodying the present invention engaging the apertures in a heater radiant.

The manner in which the fingers 56 intermesh with the apertures 18 in the heater radiant may be understood more clearly by referring to FIGURE 6. Illustrated therein is a plurality of elongated members or fingers 56 extending into a like number of the apertures 18 in the heater radiant 10. The tapered walls along the zone B of the fingers 56 fit snugly against the sides of the interconnecting members or ribs 16 and vibrates axially therein to remove substantially all of the burrs left by the die-flashing.

As mentioned hereinbefore there is a slight amount of variable shrinkage due to the method by which the radiant body is formed. Thus the pattern in the face 15 of each heater radiant varies somewhat from radiant to radiant with the apertures 18 defined by the interconnecting members of ribs 16 varying slightly in their lateral arrangement. The material comprising the resilient body 45 permits the fingers 56 to be deflected laterally slightly to allow for slight variations in structure of the heater radiants and provides for the fingers 56 to fit snugly into each aperture along the coplanar tapered zone B.

If it were not for the fact that there is an allowance for slight lateral deflection of the fingers, the heater radiants or other similar ceramic bodies would easily be broken. In the instant situation some of the interconnecting ribs 16 would be broken out if they did not conform to the pattern defined by the array of fingers.

The composition of the resilient material which may be used for supporting the elongated members or fingers 56 in the container or box may vary in scope considerably. Almost any non-rigid material capable of bonding the fingers to itself and permit lateral deflection of the fingers may be used.

It is of advantage to use a resilient material which can be formed and cast in place. Particularly preferred are the room temperature vulcanizing molding synthetic rubbers. Exemplary of such compositions are the polysulfide rubbers which are advanced to cure in situ by the addition of certain curing agents well known to those skilled in the art. A proprietary composition of this type particularly useful for casting a resilient body about the array of fettling fingers is a cold molding polysulfide sold under the trademark Black Tufy, by the Perma-Flex Mold Co. see U.S. Patent 2,600,354.

In addition to the means for mechanically vibrating the die-flashing removal means which comprise part of the preferred embodiment illustrating the instant invention other vibrating means may be used. If the same general construction is used for the apparatus, where the die-flashing removal means is movably mounted on vertical guide members 38 a vibrating means, other than the mechanical means disclosed herein, may be positioned between the horizontal base 36 and the rigid plate 40 so that the plate 40 is forced to vibrate vertically along the path defined by the guide members.

Both electricity-driven and air-driven vibrators may be use. A specific example of the electricity-driven class of vibrators is the Synthron pulsating magnet type sold by the Syntron Co. Air-driven vibrators particularly useful are the pneumatic reciprocating piston type.

In use, these electricity-driven or air-driven vibrators are fixedly attached to the underside of the rigid plate member 40 supporting the resilient body 45 and the array of elongated members or fingers 56.

Although there has been presented a particular and preferred embodiment of the present invention setting forth specific means for carrying the instant invention into effect, it is not intended that the invention be limited solely thereto, but to include all of the variations and modifications falling within the scope of the appended claims.

I claim:
1. Apparatus for removing die-flashing from the apertures of a friable body, said apparatus having a support, a reciprocating member mounted on said support, means for reciprocating said member, said member having affixed thereto and reciprocal therewith a multiplicity of substantially rigid tapered members elongated in the direction of reciprocation and positioned to form an array thereof corresponding substantially to the pattern formed by said apertures, the tapered ends of said tapered members being smaller than said apertures, said tapered members having a cross-sectional configuration corresponding substantially to the configuration of said apertures, said tapered members, upon reciprocation thereof, adaptable to penetrate and enter apertures in said body to a predetermined depth, when said body is positioned such that its apertures correspond to and are aligned with the array of tapered members, and means, carrying said tapered members, permitting their tapered ends to be temporarily laterally deflected upon off-center, reciprocating contact thereof with any portion of said friable body surrounding and forming said apertures, without rupturing same.

2. The apparatus of claim 1 wherein the last mentioned means is a bed of resilient elastomeric material having the wider ends of said tapered members firmly but flexibly mounted therein.

3. In an apparatus for removing die-flashing from the apertures of a friable, apertured body, said apparatus having a support, a reciprocating member mounted on said support, means for reciprocating said member, said member having affixed thereto and reciprocal therewith a multiplicity of tapered members elongated in the direction of reciprocation and positioned to form an array thereof corresponding substantially to the pattern formed by said apertures, said tapered members having a cross-sectional configuration substantially the same as the configuration of said apertures, the tapered ends of said tapered members being smaller than said apertures, said tapered members, upon reciprocation thereof, adaptable to penetrate and enter their respective corresponding apertures in said body to a predetermined depth, when said body is positioned such that its apertures correspond to the array of tapered members, the improvement in combination therewith of said tapered members at their tapered extremity having a terminal tip tapering at an inclination substantially greater than the inclination of said tapered portion of said tapered members affixed to said reciprocating member via a bed of resilient elastomeric material having the wider ends of said tapered members firmly but flexibly mounted therein, to permit said tapered members to be temporarily laterally deflected upon off-center, reciprocating contact thereof with any portion of said friable body surrounding and forming said apertures, without rupturing same.

References Cited
UNITED STATES PATENTS 1,730,650 10/1929 Evans _____ 51—59
2,005,260 6/1935 Huyett.

J. SPENCER OVERHOLSER, Primary Examiner.

R. D. BALDWIN, Assistant Examiner.